United States Patent
El Assaad

(10) Patent No.: US 11,265,701 B2
(45) Date of Patent: Mar. 1, 2022

(54) APPARATUS AND METHOD FOR ADDRESSING ROAD USERS IN WIRELESS COMMUNICATIONS

(71) Applicant: VOLKSWAGEN AKTIENGESELLSCHAFT, Wolfsburg (DE)

(72) Inventor: Ahmad El Assaad, Wolfsburg (DE)

(73) Assignee: Volkswagen Aktiengesellschaft

(*) Notice: Subject to any disclaimer, the term of this patent is extended or adjusted under 35 U.S.C. 154(b) by 25 days.

(21) Appl. No.: 16/870,986

(22) Filed: May 10, 2020

(65) Prior Publication Data

US 2020/0359201 A1  Nov. 12, 2020

(30) Foreign Application Priority Data

May 10, 2019 (EP) ..................... 19173721

(51) Int. Cl.
*H04W 8/26* (2009.01)
*H04W 4/46* (2018.01)

(52) U.S. Cl.
CPC ............. *H04W 8/26* (2013.01); *H04W 4/46* (2018.02)

(58) Field of Classification Search
None
See application file for complete search history.

(56) References Cited

U.S. PATENT DOCUMENTS 10,304,333 B2  5/2019 Engel et al.
10,484,850 B2* 11/2019 Kwoczek ............ H04W 12/069
2010/0019932 A1  1/2010 Goodwin
2015/0302742 A1* 10/2015 Schuller ................ G08G 1/017
340/933
2016/0295401 A1 10/2016 Berge et al.
(Continued)

FOREIGN PATENT DOCUMENTS

KR   20180064491 A   6/2018
WO   2013033686 A2   3/2013
(Continued)

OTHER PUBLICATIONS

Office Action for Korean Patent Application No. 10-2020-0054983; dated Aug. 23, 2021.

*Primary Examiner* — Lonnie V Sweet
(74) *Attorney, Agent, or Firm* — Barnes & Thornburg LLP

(57) ABSTRACT

Apparatuses, methods and computer programs for a first transportation vehicle and a second transportation vehicle. The method for the first transportation vehicle includes generating an environmental perception message based on a perception model of an environment of the first transportation vehicle, wherein the perception model includes detected objects; transmitting the environmental perception message to one or more transportation vehicles located in a vicinity of the first transportation vehicle; determining one or more second transportation vehicles among the detected objects; and transmitting one or more wireless messages to the one or more second transportation vehicles. The one or more second transportation vehicles are addressed as destination of the one or more wireless messages by referencing one or more objects of the detected objects corresponding to the one or more second transportation vehicles within the environmental perception message.

13 Claims, 4 Drawing Sheets

(56) References Cited

U.S. PATENT DOCUMENTS

| | | |
|---|---|---|
| 2018/0027388 A1 | 1/2018 | Kumabe et al. |
| 2019/0043357 A1* | 2/2019 | Stinnett ............. B60W 50/0098 |
| 2019/0251848 A1* | 8/2019 | Sivanesan ............. H04L 5/0048 |
| 2019/0364424 A1* | 11/2019 | Vanderveen ............ H04W 4/40 |
| 2020/0105131 A1* | 4/2020 | Carter ................... H04W 88/16 |
| 2020/0114920 A1* | 4/2020 | Zhang ................... H04L 9/0891 |
| 2020/0296558 A1* | 9/2020 | Adare ................ G01C 21/3602 |

FOREIGN PATENT DOCUMENTS

| | | |
|---|---|---|
| WO | 2016003430 A1 | 1/2016 |
| WO | 2017171467 A1 | 10/2017 |

\* cited by examiner

APPARATUS AND METHOD FOR ADDRESSING ROAD USERS IN WIRELESS COMMUNICATIONS

PRIORITY CLAIM

This patent application claims priority to European Patent Application No. 19173721.2, filed 10 May 2019, the disclosure of which is incorporated herein by reference in its entirety.

SUMMARY

Illustrative embodiments relate to apparatuses, methods and computer programs for a first transportation vehicle and a second transportation vehicle, more specifically, but not exclusively, to a concept for addressing transportation vehicles in wireless vehicular communications.

BRIEF DESCRIPTION OF THE DRAWINGS

Exemplary embodiments will be described using the following non-limiting embodiments of apparatuses or methods or computer programs or computer program products by way of example only, and with reference to the accompanying figures, in which.

DETAILED DESCRIPTION

Figure 1A:
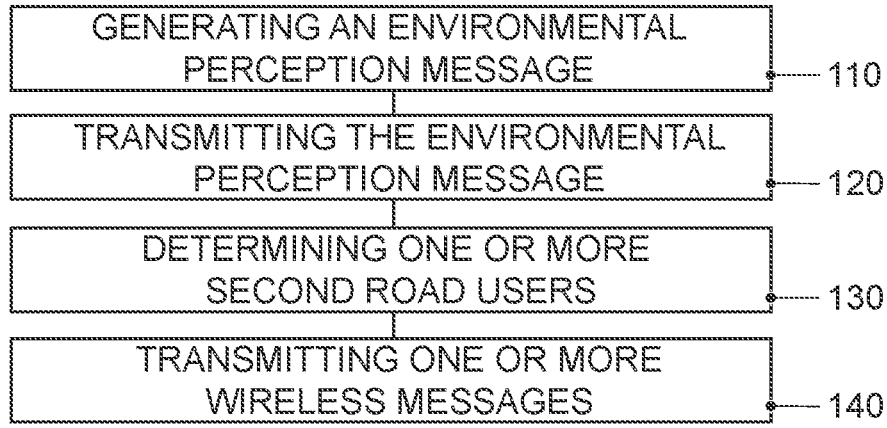
FIGS. 1a and 1b show flow charts of embodiments of a method for a first road user.

Vehicular communication is a field of research and development. In vehicular communications, a service discovery and neighboring vehicle discovery may be used to provide connected services over 5G-V2X (Vehicle-to-Everything over 5th-Generation mobile communication systems) communications. However, transportation vehicles may receive service discovery messages without having the need to use offered services. Furthermore, the transmission of data offering V2V (Vehicle-to-Vehicle) services may occupy the 5G-V2X communication channel, wasting resources if the services is not or partially needed by transportation vehicles. Additionally, the addressability of transportation vehicles may be desired to be anonymous in these type of communications to avoid tracking of transportation vehicles.

Some addressability schemes in vehicular networks use the conventional service discovery and neighboring discovery procedures, where the offered service may not be interesting for all transportation vehicle and may waste bandwidth in 5G-V2X channels. For example, in 3GPP release 12, 14 and 15, the addressability may not be guaranteed to be anonymous since the L2 addresses are used in proximity services. In release 16, a separate L2 (Layer 2) address for 5G-V2X multicast/unicast is used which is generated via a middleware, which translates "StationID" on application layer to a L2 address. If this "StationID" is fixed, the object may be tracked. Further, if multiple transportation vehicles/road users use the same "StationID", the addressability may fail. V2V addressability schemes may therefore suffer from lack in anonymity, lack in verification of correct addressability, and the service offer may be provided to road users/transportation vehicles that might not need the service and flood the communication channels with unnecessary data transmissions.

International patent application WO 2016/003430 A1 relates to vehicle communication identifiers that are based on license plate information. In the application, a first transportation vehicle performs image recognition of a license plate of a second transportation vehicle, and uses the license plate to address the second transportation vehicle.

There may be a desire for an improved addressability scheme for wireless vehicular communication.

This desire is addressed by the subject of the independent claims.

Disclosed embodiments are based on the finding that, instead of using a permanent or semi-permanent address of a road user (i.e., a transportation vehicle, such as a car or a bike), in the initial contact between road users, a perception model of the road user may be used to specify a destination of a wireless message. For example, road users may determine perception models of the environment of the road users. These perception models contain a multitude of different objects that have been identified by the road users. Among those objects may be other road users, e.g., one or more second road users. If a first road user now intends to contact the one or more second road users, the first road user may transmit an environmental perception message to road users in a vicinity of the first model, and subsequently a wireless message that references an object corresponding to a road user of the one or more second road users within that environmental perception message. The one or more second road users may receive both the environmental perception message and the wireless message, identify themselves within the environmental model of the environmental perception message, therefore enabling an addressing of the one or more second road users via their respective objects within the perception model.

Disclosed embodiments provide a method for method for a first road user. The method comprises generating an environmental perception message based on a perception model of an environment of the first road user. The perception model comprises a plurality of detected objects. The method comprises transmitting the environmental perception message to one or more road users located in a vicinity of the first road user. The method comprises determining one or more second road users among the plurality of detected objects. The method comprises transmitting one or more wireless messages to the one or more second road users. The one or more second road users are addressed as destination of the one or more wireless messages by referencing one or more objects (of the plurality of detected objects) corresponding to the one or more second road users within the environmental perception message. This may provide an anonymous addressability of the one or more second road users.

The method may further comprise receiving one or more responses to the one or more wireless messages from the one or more second road users. For example, the one or more responses may indicate that the one or more second road users have successfully received the one or more wireless messages.

For example, the one or more wireless messages may comprise or indicate a temporary identifier of the first road user. The first road user may be addressed within the one or more responses based on the temporary identifier of the first road user. This may enable a quasi-anonymous addressing of the first road user, as the temporary identifier can be changed once a connected vehicle service the communication pertains to is over, i.e., each communication relating to a connected vehicle service may be based on separate temporary identifier.

The temporary identifier of the first road user may be based on the environmental perception message of the first road user. For example, the temporary identifier may be based on a mathematical transformation of at least parts of the environmental perception message of the first road user, e.g., a hash value of at least parts of the environmental perception message. This may enable using the previously received environmental perception message to address the first road user.

In some disclosed embodiments, the method comprises renewing the temporary identifier based on a validity criterion. This may enable a periodic or event-driven renewal of the temporary identifier.

In some disclosed embodiments, the first road user may be based on further environmental perception messages of the one or more second road users. The method may comprise receiving one or more further environmental perception messages from the one or more second road users. The one or more further environmental perception messages may be based on one or more perception models of an environment of the one or more second road users. The first road user may be addressed within the one or more responses by referencing the first road user within the one or more perception models of the environment of the one or more second road users. This may provide an anonymous addressability of the first road user.

For example, the one or more wireless messages may comprise a request for a connected vehicle service. The one or more responses to the one or more wireless messages may indicate that the respective second road users are willing to provide the connected vehicle service. This may enable an initiation of the connected road user between the first road user and the one or more second road users.

In some disclosed embodiments, the one or more wireless messages comprise or indicate a temporary identifier of the first road user. The temporary identifier may be valid for a duration of the connected vehicle service. This may avoid a tracking of the first road user.

The method may further comprise initiating the connected vehicle service based on the one or more responses to the one or more wireless messages. For example, the connected vehicle service may be used to provide additional sensor data, may be left turning assist at a crossing, overtake assist at rural road, etc.; Connected services may be connected functions which require communications between road users/road users to enable the service functions) that are used by the first road user and the one or more second road users.

Disclosed embodiments further provide a method for a road user. The method comprises receiving an environmental perception message from a first road user. The environmental perception message is based on a perception model of an environment of the first road user. The perception model comprises a plurality of detected objects. The method comprises receiving one or more wireless messages from the first road user. One or more second road users are addressed as destination of the one or more wireless messages by referencing one or more objects of the plurality of detected objects corresponding to the one or more second road users within the environmental perception message. The method comprises identifying the road user among the plurality of detected objects of the perception model. The method comprises determining, whether the road user is one of the one or more second road users based on the identification of the road user among the plurality of detected objects of the perception model. The method comprises transmitting a response to the one or more wireless messages if the road user is one of the one or more second road users. Using this method, the second road users may identify themselves as recipients of the one or more wireless messages.

For example, the one or more wireless messages may comprise a temporary identifier of the first road user. The first road user may be addressed within the response based on the temporary identifier of the first road user. This may enable a quasi-anonymous addressing of the first road user, as the temporary identifier can be changed once a connected vehicle service the communication pertains to is over, i.e., each communication relating to a connected vehicle service may be based on separate temporary identifier.

Alternatively or additionally, the method may comprise generating a further environmental perception message based on a further perception model of an environment of the road user. The further perception model of the environment of the road user may comprise a further plurality of detected objects. The method may comprise transmitting the further environmental perception message to one or more road users located in a vicinity of the road user. The first road user may be addressed within the response by referencing an object of the further plurality of detected objects corresponding to the first road user. This may enable addressing the first road user using the further environmental perception message.

Disclosed embodiments further provide computer program having a program code for performing at least one of the methods, when the computer program is executed on a computer, a processor, or a programmable hardware component.

Disclosed embodiments further provide an apparatus for a first road user. The apparatus comprises a wireless communication interface for communicating with one or more road users located in a vicinity of the first road user. The apparatus comprises a control module configured to generate an environmental perception message based on a perception model of an environment of the first road user. The perception model comprises a plurality of detected objects. The control module is configured to transmit the environmental perception message to the one or more road users located in a vicinity of the first road user via the wireless communication interface. The control module is configured to determine one or more second road users among the plurality of detected objects. The control module is configured to transmit one or more wireless messages to the one or more second road users via the wireless communication interface. The one or more second road users are addressed as destination of the one or more wireless messages by referencing one or more objects of the plurality of detected objects corresponding to the one or more second road users within the environmental perception message.

Disclosed embodiments further provide an apparatus for a (second) road user. The apparatus comprises a wireless communication interface for communicating with one or more road users located in a vicinity of the road user. The apparatus comprises a control module configured to receive an environmental perception message from a first road user via the wireless communication interface. The environmental perception message is based on a perception model of an environment of the first road user. The perception model comprises a plurality of detected objects. The control module is configured to receive one or more wireless messages from the first road user. One or more second road users are addressed as destination of the one or more wireless messages by referencing one or more objects of the plurality of detected objects corresponding to the one or more second road users within the environmental perception message. The control module is configured to identify the road user among the plurality of detected objects of the perception model. The control module is configured to determine, whether the road user is one of the one or more second road users based on the identification of the road user among the plurality of detected objects of the perception model. The control module is configured to transmit a response to the one or more wireless messages if the road user is one of the one or more second road users.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosed embodiments. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements or components, but do not preclude the presence or addition of one or more other features, integers, steps, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1B:
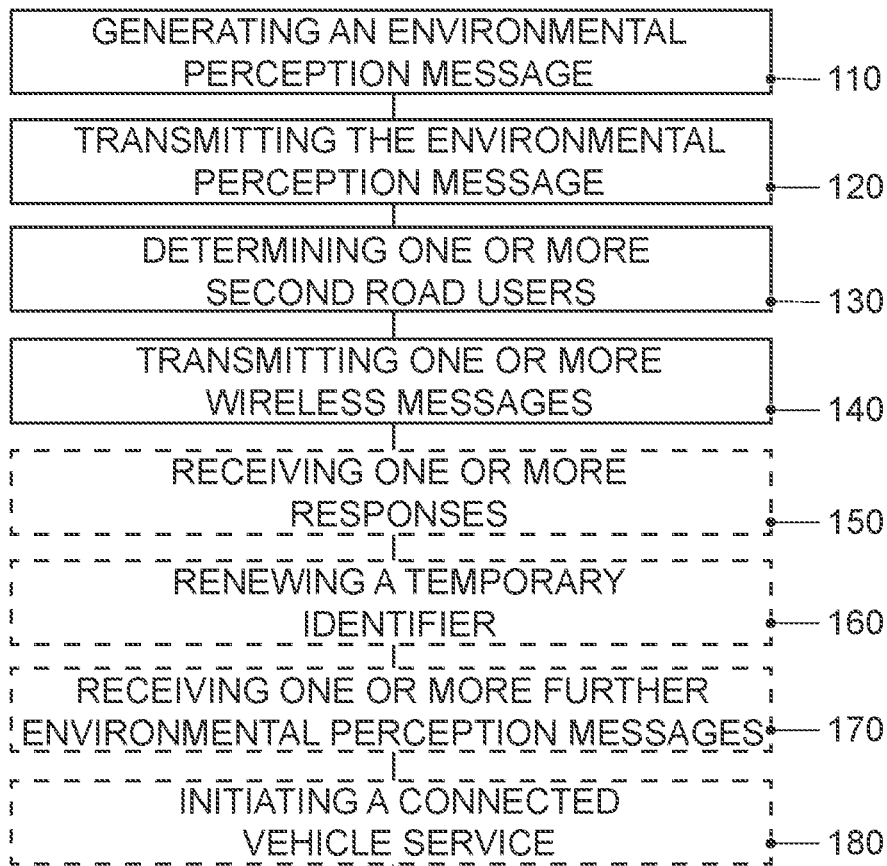

FIGS. 1a and 1b show flow charts of exemplary embodiments of a method for a first road user 100. The method comprises generating 110 an environmental perception message based on a perception model of an environment of the first road user 100. The perception model comprises a plurality of detected objects. The method comprises transmitting 120 (i.e., broadcasting) the environmental perception message to one or more road users located in a vicinity of the first road user 100. The method comprises determining 130 (i.e., identifying) one or more second road users 200 among the plurality of detected objects. The method comprises transmitting 140 one or more wireless messages to the one or more second road users 200. The one or more second road users 200 are addressed as destination of the one or more wireless messages by referencing one or more objects (of the plurality of detected objects) corresponding to the one or more second road users 200 within the environmental perception message. For example, the method may be executed by the first road user 100.

Figure 1C:
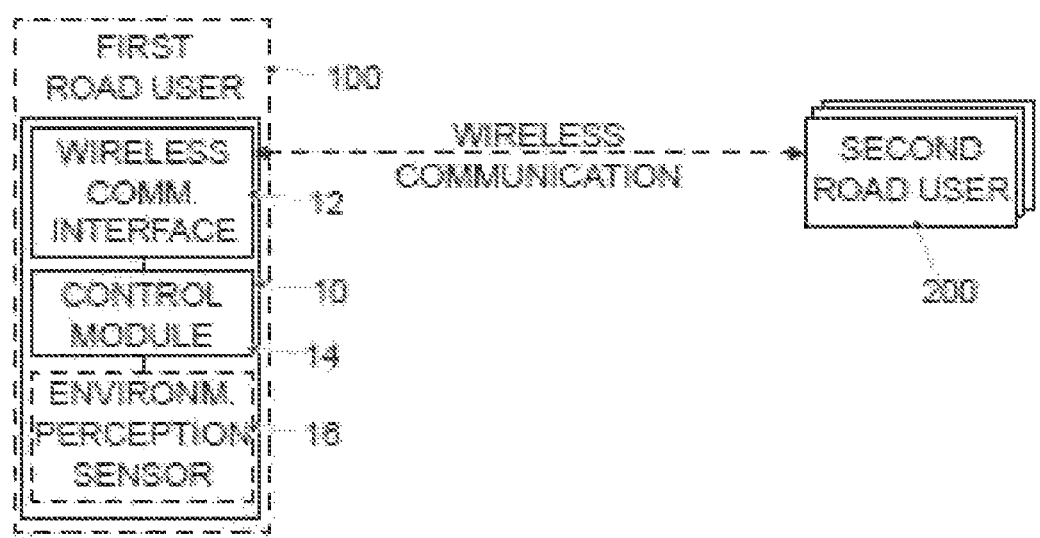
FIG. 1c shows a block diagram of an embodiment of an apparatus for a first road user.

FIG. 1c shows a block diagram of an exemplary embodiment of a (corresponding) apparatus 10 for a first road user 100. The apparatus 10 comprises a wireless communication interface 12 for communicating with one or more road users located in a vicinity of the first road user 100. The apparatus 10 comprises a control module 14 that is coupled to the wireless communication interface 12, and which may be coupled to one or more optional perception sensors 16. The control module 14 may be configured to execute the method of FIGS. 1a and/or 1b, e.g., in conjunction with the wireless communication interface 12. For example, the control module is configured to generate an environmental perception message based on a perception model of an environment of the first road user 100. The perception model comprises a plurality of detected objects. The control module is configured to transmit the environmental perception message to the one or more road users located in a vicinity of the first road user 100 via the wireless communication interface 12. The control module 14 is configured to determine one or more second road users 200 among the plurality of detected objects. The control module 14 is configured to transmit one or more wireless messages to the one or more second road users 200 via the wireless communication interface. The one or more second road users 200 are addressed as destination of the one or more wireless messages by referencing one or more objects (of the plurality of detected objects) corresponding to the one or more second road users 200 within the environmental perception message. FIG. 1c further shows the first road user 100, e.g., a transportation vehicle, comprising the apparatus 10. FIG. 1c further shows a system comprising the first road user 100 and the one or more second road users 200.

The following description relates both to the method of FIGS. 1a and/or 1b, and to the apparatus 10 of FIG. 1c.

At least some disclosed embodiments relate to a method, apparatus and computer program for a first road user 100. For example, the first road user may be a transportation vehicle, such as an automobile, a truck, a lorry, a motorbike or a bicycle. Alternatively, the first road user may be a user with a smartphone. Analogously, the road users in the vicinity of the first road user and/or the second road users may be transportation vehicles or users with a smartphone. The method, apparatus and computer program may be used to provide the road user with a novel approach of addressing other road users that are located in a vicinity of the first road user. Therefore, disclosed embodiments are based on generating the perception model of the environment of the first road user. The perception model may be an abstract model of the plurality of detected objects that surround the first road user, which may include other road users/transportation vehicles, road infrastructure, lanes of the road etc. Among those objects, the first road user determines, which of the objects are other road user, and among the other road users, the first road user selects the one or more second road users the first road user desires to communicate with. For example, if the first road user desires to perform a coordinated lane merge maneuver with the one or more second transportation vehicles, it identifies the respective road users among the plurality of detected objects, and transmits the one or more wireless messages to them. As, in at least some disclosed embodiments, to maintain anonymity, the first road user has no knowledge of the identifiers of the one or more second transportation vehicles, it broadcasts the environmental perception message comprising the plurality of detected objects to road users in a vicinity of the first road user, and references the previously transmitted environmental perception message in the one or more wireless messages. Within the transmitted environmental perception message, the first road user points to the objects that correspond to the one or more second road users, which may identify themselves using the transmitted environmental perception message to ascertain, that the one or more wireless messages are addressed to them.

The method comprises generating 110 the environmental perception message based on the perception model of the environment of the first road user 100. For example, the environmental perception message may be a Cooperative Perception Messages (CPM) of a vehicular communication system. For example, the environmental perception message may comprise the perception or at least parts of the perception model of the environment of the first road user. For example, the perception model may comprise modeling information for an area surrounding the first road user. The perception model may comprise information related to static objects, e.g., buildings, road signs, etc. and dynamic objects, e.g., pedestrians, cyclists, etc., around the road user/road users that are detected by the first road user. In other words, the plurality of detected objects may comprise the static objects and/or the dynamic objects. The method may comprise determining the perception model (e.g., at an application layer of the first road user), based on the one or more perception sensors 16 of the first road user. Alternatively, the perception model may be generated by a backend, e.g., based on (accumulated) sensor data of the first road user and/or of the one or more second road users, and provided to the first road user by the backend. The perception model may relate to the plurality of detected objects that have been identified by the first road user using the one or more perception sensors of the first road user. For example, the one or more perception sensors of the first road user may comprise at least one of a RADAR (Radio Detection and Ranging) sensor, a LIDAR (Light Detection and Ranging) sensor, a camera sensor and an ultrasound sensor. The perception model, and therefore the environmental perception message, might not comprise the respective sensor data, but might correspond to a high-level abstraction of the sensor data of the one or more perception sensors of the first road user. For example, the perception model may comprise information related to a position and/or of an extent of the plurality of detected objects that have been identified by the first road user using the one or more perception sensors. In some disclosed embodiments, the perception model of the environmental perception data may comprise information related to an identifier of the plurality of detected objects that have been identified by the first road user using the one or more perception sensors, e.g., if the objects are other road users.

The method comprises transmitting 120 (i.e., broadcasting) the environmental perception message to one or more road users located in a vicinity of the first road user 100, e.g., via a mobile communication system, or more specifically, via a vehicular communication system. In general, the mobile communication system may for example, correspond to one of the Third Generation Partnership Project (3GPP)-standardized mobile communication networks, where the term mobile communication system is used synonymously to mobile communication network. The mobile or wireless communication system may correspond to, for example, a 5th Generation system (5G), a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc. The mobile communication system may be a vehicular communication system, e.g., a vehicle-to-network (V2N) or vehicle-to-vehicle (V2V) communication system. For example, the mobile communication system may be or may be based on a C-V2X (Cellular-Vehicle-to-Anything, which may comprise Long Term Evolution Vehicle-to-Anything, LTE-V2X, and 5th generation mobile communication system V2X, 5G-V2X) mobile communication system. The mobile communication system may support two communication modes: PC5, which is used between transportation vehicles, and Uu, which is used between transportation vehicles and base stations. Using PC5 and Uu, the mobile communication system may support direct vehicle-to-vehicle communication (without involvement of a base station as a communication hop, using PC5, either managed by the base station or autonomously), vehicle-to-vehicle communication via a base station of the mobile communication system, and vehicle-to-network communication via a base station of the mobile communication system. In disclosed embodiments, the environment perception message may be transmitted 120 via PC5.

The method comprises determining 130 the one or more second road users 200 among the plurality of detected objects. This may be a two-step process: First, the objects of the plurality of detected objects that are other road users may be identified. Among the other road users, the one or more second road users 200 may be selected. In other words, the determining of the one or more second road users may comprise selecting the one or more second road users among the plurality of detected objects based on a selection criterion. In some disclosed embodiments, the selection criterion may be based on a connected vehicle service the first road user intends to use, i.e., a connected vehicle communication service, or short connected vehicle service; Connected vehicle services may be left turning assist at a crossing, overtake assistance, exchange of sensor data to extend a field of view of the first road user etc.; Connected vehicle services may be connected functions which require communications between road users/transportation vehicles to enable the service functions. For example, the first road user may intend to use a connected vehicle service. The one or more wireless messages may comprise a request for the connected vehicle service. The one or more second transportation vehicles may be selected based on a utility or a suitability of the one or more second transportation vehicles for the intended connected vehicle service. For example, if the first road user intends to use a connected vehicle service for left turning assistance at a crossing, it might select the one or more second road users among the road users that might yield to the first road user; if the first road user intends to use an overtake assistance connected vehicle service, it might select the one or more second road users among the road users that are to be overtaken and/or the road users that might provide useful sensor information to extend the field of view of the first road user before overtaking.

The method further comprises transmitting 140 the one or more wireless messages to the one or more second road users 200, e.g., using one or more unicast messages or a multicast message, e.g., via the mobile communication system/vehicular communication system.

The one or more second road users 200 are addressed as destination of the one or more wireless messages by referencing the one or more objects of the plurality of detected objects corresponding to the one or more second road users 200 within the environmental perception message. For example, the one or more wireless messages may comprise a reference to the environmental perception message, e.g., an identifier and/or a hash value of the environmental perception message. Additionally, the one or more wireless messages may comprise a reference to the one or more objects of the plurality of detected objects corresponding to the one or more second road users 200, e.g., an environmental perception message-specific identifier of the one or more objects. For example, to reference the one or more second transportation vehicles, the method may comprise determining the environmental perception message-specific identifiers of the one or more objects corresponding to the one or more second transportation vehicles, and to include the environmental perception message-specific identifiers in the one or more wireless messages, e.g., as unicast or multicast addresses (together with an implicit or explicit reference to the environmental perception message).

In at least some disclosed embodiments, as further shown in FIG. 1*b*, the method may further comprise receiving 150 one or more responses to the one or more wireless messages from the one or more second road users 200, e.g., via the mobile communication system/vehicular communication system.

In at least some disclosed embodiments, the one or more responses may be addressed to the first road user 100 using a temporary identifier of the first road user 100. This temporary identifier may be included in the one or more wireless messages and/or may be derivable from the environmental perception message. In other words, the one or more wireless messages may comprise or indicate the temporary identifier of the first road user 100. The first road user 100 may be addressed within the one or more responses based on the temporary identifier of the first road user 100. For example, the temporary identifier may be a random value that is renewed on a regular basis. It may be generated by the first road user, and included in the one or more wireless messages, or it may be based on the environmental perception message, and indicated by the one or more wireless messages (by referencing the environmental perception message). In other words, the temporary identifier of the first road user 100 may be based on the environmental perception message of the first road user 100. For example, the temporary identifier may be based on a mathematical transformation, such as a hash value, of at least parts of the environmental perception message of the first road user 100.

In at least some disclosed embodiments, the method may comprise renewing 160 the temporary identifier based on a validity criterion. For example, the temporary identifier may be renewed periodically, e.g., by transmitting a new environmental perception message, or event-based, e.g., after a connected vehicle service has been used. For example, the one or more wireless messages may comprise a request for a connected vehicle service. The one or more responses to the one or more wireless messages may indicate that the respective second road users are willing to provide the connected vehicle service. The temporary identifier may be valid for a duration of the connected vehicle service.

Alternatively, environmental perception messages of the one or more second transportation vehicles may be used to address the first transportation vehicle. In other words, the method may comprise receiving 170 one or more further environmental perception messages from the one or more second road users 200/The one or more further environmental perception messages may be based on one or more perception models of an environment of the one or more second road users 200 (analog to the environmental perception message of the first road user). The first road user 100 may be addressed within the one or more responses by referencing the first road user 100 within the one or more perception models of the environment of the one or more second road users 200, e.g., by referencing an object corresponding to the first road user within the environmental perception messages, and including the reference in the one or more responses.

The method may comprise validating/verifying the one or more responses, e.g., to verify that the one or more responses have been transmitted by the one or more second transportation vehicles. For example, the one or more responses may be validated/verified based on the environmental perception message and/or based on the one or more further environmental perception messages of the one or more second transportation vehicles.

The method may further comprise initiating 180 the connected vehicle service based on the one or more responses to the one or more wireless messages, e.g., using one or more temporary identifiers of the one or more second transportation vehicles comprised or indicated by the one or more responses.

The wireless communication interface 12 may correspond to one or more inputs and/or outputs for receiving and/or transmitting information, which may be in digital (bit) values according to a specified code, within a module, between modules or between modules of different entities. The wireless communication interface 12 may be configured to communicate in the mobile communication system. In other words, the wireless communication interface 12 may be or comprise a wireless transceiver for communicating in the mobile communication system. The wireless transceiver may be implemented for transceiving, i.e., receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc.

In disclosed embodiments the control module 14 may be implemented using one or more processing units, one or more processing devices, any methods or mechanisms for processing, such as a processor, a computer or a programmable hardware component being operable with accordingly adapted software. In other words, the described function of the control module 14 may as well be implemented in software, which is then executed on one or more programmable hardware components. Such hardware components may comprise a general-purpose processor, a Digital Signal Processor (DSP), a micro-controller, etc.

Figure 2A:
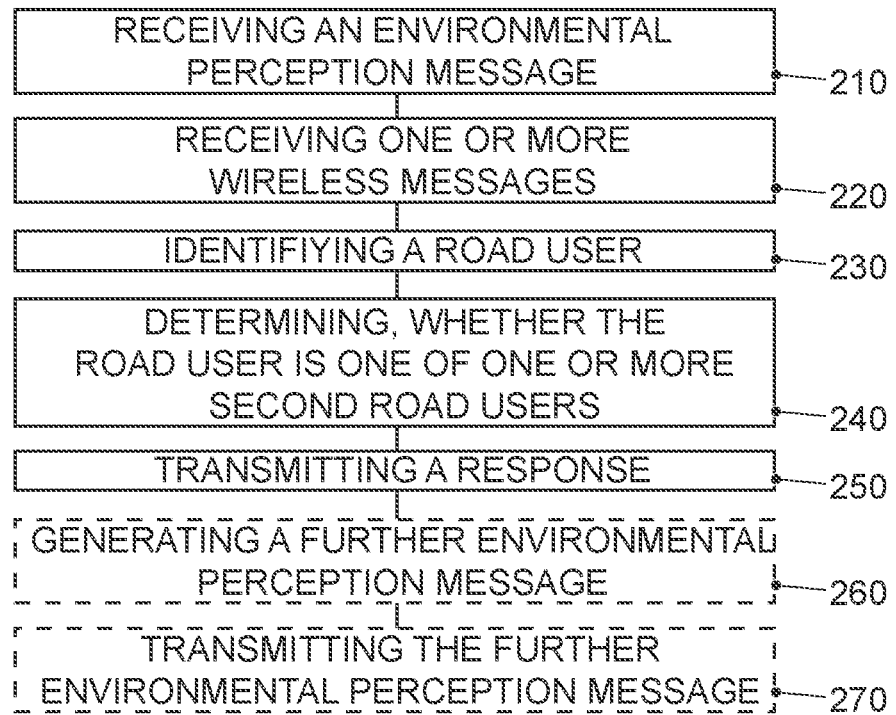
FIG. 2a shows a flow chart of an embodiment of a method for a second road user.

FIG. 2a shows a flow chart of an exemplary embodiment of a method for a (second) road user. The method comprises receiving 210 an environmental perception message from a first road user 100. The environmental perception message is based on a perception model of an environment of the first road user 100. The perception model comprises a plurality of detected objects. The method comprises receiving 220 (in addition to the environmental perception message) one or more wireless messages from the first road user 100. One or more second road users 200 are addressed as destination of the one or more wireless messages by referencing one or more objects of the plurality of detected objects corresponding to the one or more second road users 200 within the environmental perception message. The method comprises identifying 230 the (second) road user among the plurality of detected objects of the perception model. The method comprises determining 240, whether the road user is one of the one or more second road users 200 based on the identification of the road user among the plurality of detected objects of the perception model. The method comprises transmitting 250 a response to the one or more wireless messages (to the firsts road user) if the road user is one of the one or more second road users 200. For example, the method may be executed by the (second) road user.

Figure 2B:
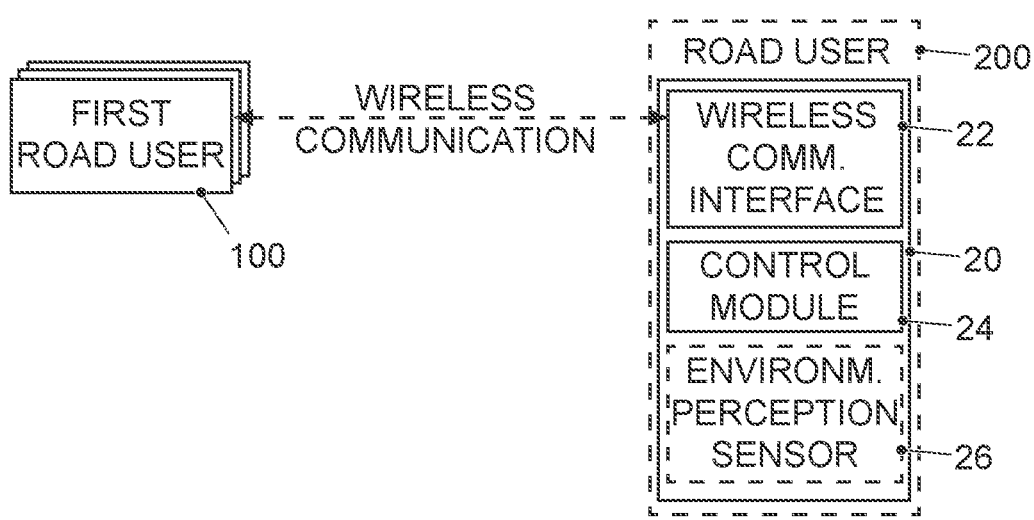
FIG. 2b shows a block diagram of an embodiment of an apparatus for a second road user.

FIG. 2b shows a block diagram of an exemplary embodiment of a (corresponding) apparatus 20 for a (second) road user 200. The apparatus 20 comprises a wireless communication interface 22 for communicating with one or more road users located in a vicinity of the road user. The apparatus 20 comprises a control module 24 that is coupled to the wireless communication interface 22, and that may be coupled to one or more optional perception sensors 26 (which may be implemented similar to the one or more perception sensors of FIG. 1c). The control module 24 may be configured to execute the method of FIG. 2a, e.g., in conjunction with the wireless communication interface 22 and/or with the optional one or more perception sensors. For example, the control module 24 is configured to receive an environmental perception message from a first road user 100 via the wireless communication interface 22. The environmental perception message is based on a perception model of an environment of the first road user 100. The perception model comprises a plurality of detected objects. The control module 24 is configured to receive one or more wireless messages from the first road user 100 (via the wireless communication interface 2). One or more second road users 200 are addressed as destination of the one or more wireless messages by referencing one or more objects of the plurality of detected objects corresponding to the one or more second road users 200 within the environmental perception message. The control module 24 is configured to identify the road user among the plurality of detected objects of the perception model. The control module 24 is configured to determine, whether the road user is one of the one or more second road users 200 based on the identification of the road user among the plurality of detected objects of the perception model. The control module 24 is configured to transmit a response to the one or more wireless messages (to the first road user via the wireless communication interface 22) if the road user is one of the one or more second road users 200. FIG. 2b further shows the (second) road user comprising the apparatus 20. FIG. 2b further shows a system comprising the first road user 100 and the second road user 200.

The following description relates both to the method of FIG. 2a and to the apparatus 20 of FIG. 2b.

The method comprises receiving 210 the environmental perception message from the first road user, e.g., via a mobile communication system and/or a vehicular communication system (as introduced in connection with FIGS. 1a to 1c). The method comprises receiving 220 the one or more wireless messages from the first road user 100, e.g., via the mobile communication system and/or the vehicular communication system.

The method comprises Identifying 230 the road user (i.e., an object corresponding to the road user) among the plurality of detected objects of the perception model. For example, the method may comprise selecting the road users among the plurality of detected objects. Among the selected road users, the road used may be identified by comparing the properties of the selected road users with properties of the road users, e.g., by comparing a size, shape and/or color of the selected road users with a size, shape and/or color of the (second) road user, and/or by comparing a position of the selected road users relative to the first road user with a position of the (second) road user relative to the first road user. The method further comprises determining 240, whether the road user is one of the one or more second road users 200 based on the identification of the road user among the plurality of detected objects of the perception model. For example, the one or more wireless messages may comprise a reference to one or more objects that correspond to the one or more second road users. If the object corresponding to the road user is among the one or more objects, the road user is one of the one or more second road users 200.

The method comprises transmitting 250 a response to the one or more wireless messages (only) if the road user is one of the one or more second road users 200. To address the first road user, as introduced in connection with FIGS. 1a to 1c, the road use might either use a temporary identifier of the first road user or a further environmental perception message generated by the road user. In other words, the one or more wireless messages may comprise or indicate a temporary identifier of the first road user 100 (as specified above). The first road user 100 may be addressed within the response based on the temporary identifier of the first road user 100. Alternatively, the method may comprise generating 260 a further environmental perception message based on a further perception model of an environment of the road user (similar to generating the environmental perception message of the first road user). The further perception model of the environment of the road user may comprise a further plurality of detected objects. The method may comprises transmitting 270 (i.e., broadcasting) the further environmental perception message to one or more road users located in a vicinity of the road user (e.g., via the mobile communication system/vehicular communication system). The first road user 100 may be addressed within the response by referencing an object of the further plurality of detected objects corresponding to the first road user 100 (similar to the addressing of the one or more second road users by the first road user within the one or more wireless messages).

The wireless communication interface 22 may correspond to one or more inputs and/or outputs for receiving and/or transmitting information, which may be in digital (bit) values according to a specified code, within a module, between modules or between modules of different entities. The wireless communication interface 22 may be configured to communicate in the mobile communication system. In other words, the wireless communication interface 22 may be or comprise a wireless transceiver for communicating in the mobile communication system. The wireless transceiver may be implemented as any methods or mechanisms for transceiving, i.e., receiving and/or transmitting etc., one or more transceiver units, one or more transceiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc.

In disclosed embodiments the control module 24 may be implemented using one or more processing units, one or more processing devices, any methods or mechanisms for processing, such as a processor, a computer or a programmable hardware component being operable with accordingly adapted software. In other words, the described function of the control module 24 may as well be implemented in software, which is then executed on one or more programmable hardware components. Such hardware components may comprise a general-purpose processor, a Digital Signal Processor (DSP), a micro-controller, etc.

More details of the method and/or apparatus 20 are mentioned in connection with the proposed concept or one or more examples described above (e.g., FIG. 1a to 1c). The method and/or apparatus 20 may comprise one or more additional optional features corresponding to one or more properties of the proposed concept or one or more examples described above or below.

At least some disclosed embodiments use environmental perception for services oriented and anonymous addressability. Disclosed embodiments provide an approach for an improved addressability scheme.

Disclosed embodiments may be based on using environment perception which is acquired via V2V channel in short range communication, e.g., using cooperative perception messages (CPM) or/and generated at a backend which monitors the environment from the perspective of an individual road user/transportation vehicle.

The environmental perception may provide an environmental model (e.g., the perception model) composed of or comprising detected static and dynamic objects in the perception range of the techniques used in the perception procedure. The environmental model may be exploited on the transportation vehicle side (e.g., at the road user) to assess and predict the traffic situations. Based on this procedure, the needed V2V (also V2P, Vehicle-to-Pedestrian, V2I, Vehicle-to-Infrastructure, V2X, Vehicle-to-Everything in general) services may be determined in location and time (time span) and the relevant road users (transportation vehicles, e.g., the one or more second transportation vehicles) for direct communications (5G-V2X) may be identified. The environmental model may be used in this procedure as well. The considered transportation vehicle (e.g., the first road user) may request relevant services from relevant road users (e.g., the one or more second road users) via 5G-V2X unicast or multicast communication (e.g., via the one or more wireless messages). The road users may reply with a response (e.g., the one or more responses) including the availability of the requested connected service, its current position of the road user and the timestamp of sending the response as well. Assuming a positive acknowledgment that the requested service(s) is (are) available at the relevant road users (transportation vehicles), a verification on the considered transportation vehicle may be carried out to ensure that the received responses are incoming from the relevant road users.

For this purpose, the environmental model may be used and the current position with the timestamps received from the road users (transportation vehicles) may be used as well. If a response is validated to be received from a relevant road user (e.g., from the one or more second road users), then the 5G-V2X unicast (multicast in case of multiple road users) may be established and the data of the connected services may be exchanged over the unicast/multicast links. Otherwise, the connection may be released.

Figure 3:
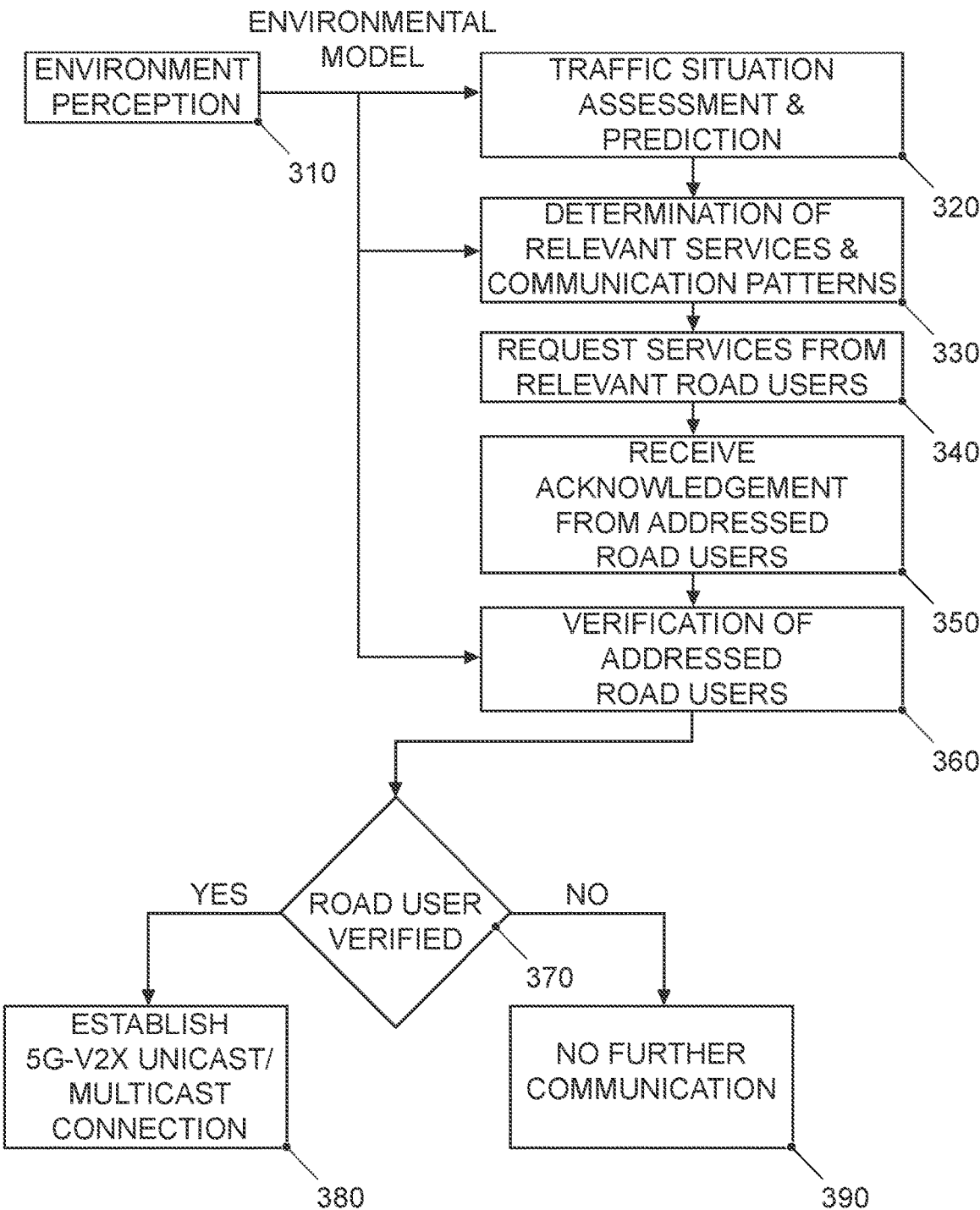
FIG. 3 shows a flow chart of an embodiment of a method.

FIG. 3 shows a flow chart of an exemplary embodiment of the method. FIG. 3 may show a procedure onboard of transportation vehicle to enable service oriented and anonymous addressability. The method comprises using a perception of the environment 310 to generate an environmental model. This environmental model may be used for a traffic situation assessment and prediction 320. Based on the traffic situation assessment and prediction and based on the environmental model, relevant services and communication patterns may be determined 330. This information may be used to request services form relevant road users 340, e.g., using the one or more wireless messages. Based on the request, acknowledgements may be received from the addressed road users 350. These acknowledgements may be verified 360 (by ascertaining that the acknowledgements originate from the addressed road users) based on the environmental model. If the respective road user is verified 370, a 5G-V2X unicast/multicast communication may be established 380, if not, no further communication 390 might be performed.

For anonymous 5G-V2X multicast communications, the "stationID" on application layer may be generated randomly at application layer (e.g., to obtain the temporary identifier) and translated to a L2 address using a middleware. However, the L2 addresses of the considered transportation vehicle and the relevant road users might only be valid as long as the connected service (s) is (are) kept alive between the considered transportation vehicle (e.g., the first road user) and the relevant road users (e.g., the one or more second road users).

More details of the approach and/or the method are mentioned in connection with the proposed concept or one or more examples described above (e.g., FIG. 1a to 2b). The approach and/or the method may comprise one or more additional optional features corresponding to one or more properties of the proposed concept or one or more examples described above or below.

As already mentioned, in disclosed embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that steps of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the steps of methods described herein. The program storage devices may be, e.g., digital memories, magnetic storage media such as magnetic disks and magnetic tapes, hard drives, or optically readable digital data storage media. The disclosed embodiments are also intended to cover computers programmed to perform the methods described herein or (field) programmable logic arrays ((F)PLAs) or (field) programmable gate arrays ((F) PGAs), programmed to perform the above-described methods.

The description and drawings merely illustrate the principles of the disclosed embodiments. It will thus be appreciated that those skilled in the art will be able to devise various arrangements that, although not explicitly described or shown herein, embody the principles of the disclosed embodiments and are included within its spirit and scope. Furthermore, all examples recited herein are principally intended expressly to be only for pedagogical purposes to aid the reader in understanding the principles of the disclosed embodiments and the concepts contributed to furthering the art, and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosed embodiments. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate disclosed embodiment. While each claim may stand on its own as a separate disclosed embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective steps of these methods.

LIST OF REFERENCE SIGNS

10 Apparatus
12 Wireless communication module
14 Control module
16 Environmental perception sensor
20 Apparatus
22 Wireless communication module
24 Control module
26 Environmental perception sensor
100 First road user
110 Generating an environmental perception message
120 Transmitting the environmental perception message
130 Determining one or more second road users
140 Transmitting one or more wireless messages
150 Receiving one or more responses
160 Renewing a temporary identifier
170 Receiving one or more further environmental perception messages
180 Initiating a connected road user service
200 Road user/second road user
210 Receiving an environmental perception message
220 Receiving one or more wireless messages
230 Identifying a road user
240 Determining, whether the road user is one of one or more second road users
250 Transmitting a response
260 Generating a further environmental perception message
270 Transmitting the further environmental perception message
310 Environment perception
320 Traffic situation assessment and prediction
330 Determination of relevant services and communication patterns
340 Request services from relevant road users
350 Receive acknowledgement from addressed road users
360 Verification of addresses road users
370 Road user verified?
380 Yes: Establish 5G-V2X unicast/multicast connection
390 No: No further communication

The invention claimed is:

1. An apparatus for a first transportation vehicle, the apparatus comprising:
a wireless communication interface for communicating with one or more transportation vehicles located in a vicinity of the first transportation vehicle; and
a control module configured to:
generate an environmental perception message based on a perception model of an environment of the first transportation vehicle, wherein the perception model represents a plurality of detected objects identified by the first transportation vehicle using one or more perception sensors of the first transportation vehicle, the environmental perception message comprising the plurality of detected objects, broadcast the environmental perception message to the one or more transportation vehicles located in a vicinity of the first transportation vehicle via the wireless communication interface, identify and select one or more second transportation vehicles among the plurality of detected objects, and transmit one or more wireless messages to the one or more second transportation vehicles via the wireless communication interface, wherein the one or more second transportation vehicles are addressed as destination of the one or more wireless messages by referencing one or more objects of the plurality of detected objects corresponding to the one or more second transportation vehicles within the environmental perception message, wherein the one or more second transportation vehicles include a second control module that sends one or more responses to the one or more wireless messages from the first transportation vehicle, wherein the one or more responses are received from the one or more second transportation vehicles by addressing the first transportation vehicle by a temporary identifier of the first transportation vehicle that is formulated based on the environmental perception message of the first transportation vehicle sent to the one or more second transportation vehicles.

2. An apparatus for communication between one or more transportation vehicles including a first transportation vehicle and a second transportation vehicle, the apparatus being in the second transportation vehicle and comprising:

a wireless communication interface for communicating with the one or more transportation vehicles including the first transportation vehicle and being located in a vicinity of the second transportation vehicle; and a control module configured to:

receive an environmental perception message from the first transportation vehicle via the wireless communication interface, wherein the environmental perception message is based on a perception model of an environment of the first transportation vehicle, wherein the perception model represents a plurality of detected objects identified by the first transportation vehicle using one or more perception sensors of the first transportation vehicle, the environmental perception message comprising the plurality of detected objects, receive one or more wireless messages from the first transportation vehicle, wherein one or more second transportation vehicles are addressed as destination of the one or more wireless messages by referencing one or more objects of the plurality of detected objects corresponding to the one or more second transportation vehicles within the environmental perception message, identify the transportation vehicle among the plurality of detected objects of the perception model, send one or more responses to the first transportation vehicle, wherein the one or more responses are received from the second transportation vehicle by addressing the first transportation vehicle by a temporary identifier of the first transportation vehicle that is formulated based on the environmental perception message of the first transportation vehicle sent to second transportation vehicle.

3. A method for a first transportation vehicle, the method comprising:

generating an environmental perception message based on a perception model of an environment of the first transportation vehicle, wherein the perception model represents a plurality of detected objects identified by the first transportation vehicle using one or more perception sensors of the first transportation vehicle, the environmental perception message comprising the plurality of detected objects;

broadcasting the environmental perception message to one or more transportation vehicles located in a vicinity of the first transportation vehicle;

identifying and selecting one or more second transportation vehicles among the plurality of detected objects;

transmitting one or more wireless messages to the one or more second transportation vehicles, wherein the one or more second transportation vehicles are addressed as destination of the one or more wireless messages by referencing one or more objects of the plurality of detected objects corresponding to the one or more second transportation vehicles within the environmental perception message, receiving one or more responses to the one or more wireless messages from the one or more second transportation vehicles, wherein the one or more responses are received from the one or more second transportation vehicles by addressing the first transportation vehicle by a temporary identifier of the first transportation vehicle that is formulated based on the environmental perception message of the first transportation vehicle sent to the one or more second transportation vehicles.

4. The method of claim 3, wherein the one or more wireless messages comprise or indicate a temporary identifier of the first transportation vehicle, wherein the first transportation vehicle is addressed within the one or more responses based on the temporary identifier of the first transportation vehicle.

5. The method of claim 4, further comprising renewing the temporary identifier based on a validity criterion.

6. The method of claim 3, further comprising:

receiving one or more further environmental perception messages from the one or more second transportation vehicles, wherein the one or more further environmental perception messages are based on one or more perception models of an environment of the one or more second transportation vehicles, wherein the first transportation vehicle is addressed within the one or more responses by referencing the first transportation vehicle within the one or more perception models of the environment of the one or more second transportation vehicles.

7. The method of claim 3, wherein the one or more wireless messages comprise a request for a connected vehicle service, wherein the one or more responses to the one or more wireless messages indicate that the respective second transportation vehicles are willing to provide the connected vehicle service.

8. The method of claim 7, wherein the one or more wireless messages comprise or indicate a temporary identifier of the first transportation vehicle, wherein the temporary identifier is valid for a duration of the connected vehicle service.

9. The method of claim 7, further comprising initiating the connected vehicle service based on the one or more responses to the one or more wireless messages.

10. A method for communication between one or more transportation vehicles include a first transportation vehicle and a second transportation vehicle, the method comprising:
- receiving an environmental perception message from the first transportation vehicle, wherein the environmental perception message derived from a perception model of an environment of the first transportation vehicle, wherein the perception model represents a plurality of detected objects identified by the first transportation vehicle using one or more perception sensors of the first transportation vehicle, the environmental perception message comprising the plurality of detected objects;
- receiving one or more wireless messages from the first transportation vehicle, wherein the second transportation vehicle is addressed as the destination of the one or more wireless messages, and wherein the address is determined by referencing one or more objects of the plurality of detected objects corresponding to the second transportation vehicle within the environmental perception message;
- wherein determining the address comprises identifying the second transportation vehicle among the plurality of detected objects of the perception model;
- transmitting a response to the one or more wireless messages in response to the transportation vehicle being one of the one or more second transportation vehicles;
- receiving one or more responses to the one or more wireless messages from the second transportation vehicle, wherein the one or more responses are received from the second transportation vehicle by addressing the first transportation vehicle by a temporary identifier of the first transportation vehicle that is formulated based on the environmental perception message of the first transportation vehicle sent to the second transportation vehicle.

11. The method of claim 10, wherein the one or more wireless messages comprise or indicate a temporary identifier of the first transportation vehicle, wherein the first transportation vehicle is addressed within the response based on the temporary identifier of the first transportation vehicle.

12. The method of claim 10, further comprising:
- generating a further environmental perception message based on a further perception model of an environment of the transportation vehicle, wherein the further perception model of the environment of the transportation vehicle represents a further plurality of detected objects identified by the transportation vehicle using one or more perception sensors of the transportation vehicle,
- broadcasting the further environmental perception message to one or more transportation vehicles located in a vicinity of the transportation vehicle,
- wherein the first transportation vehicle is addressed within the response by referencing an object of the further plurality of detected objects corresponding to the first transportation vehicle.

13. A non-transitory computer readable medium including a computer program having program code, the computer program executable to provide functionality for a first transportation vehicle to:
- generate an environmental perception model based on a sensed environment surrounding a first transportation vehicle, wherein the sensed environment includes a plurality of detected objects identified by the first transportation vehicle using one or more perception sensors,
- generate an environmental perception message based on the environmental perception model, the environmental perception message comprising the plurality of detected objects;
- identify and select one or more second transportation vehicles among the plurality of detected objects; and
- transmit one or more wireless messages to the one or more second transportation vehicles, wherein the one or more second transportation vehicles are addressed as destination of the one or more wireless messages by referencing one or more objects of the plurality of detected objects corresponding to the one or more second transportation vehicles within the environmental perception message;
- broadcast the environmental perception message to one or more second transportation vehicles located in a vicinity of the first transportation vehicle,
- receive one or more responses to the one or more wireless messages from the one or more second transportation vehicles, wherein the one or more responses are received from the one or more second transportation vehicles by addressing the first transportation vehicle by a temporary identifier of the first transportation vehicle that is formulated based on the environmental perception message of the first transportation vehicle sent to the one or more second transportation vehicle.

* * * * *